United States Patent [19]
Cohen

[11] 3,720,318
[45] March 13, 1973

[54] FILTER AND WATER RECIRCULATION SYSTEM

[75] Inventor: Harvey K. Cohen, Brooklyn, N.Y.

[73] Assignee: Bernice G. Conn, Brooklyn, N.Y.; a part interest

[22] Filed: March 23, 1971

[21] Appl. No.: 127,292

[52] U.S. Cl.....................................210/169, 119/5
[51] Int. Cl...........................E04h 3/16, E04h 3/20
[58] Field of Search ..........................210/169; 119/5

[56] References Cited

UNITED STATES PATENTS

| | | |
|---|---|---|
| 3,516,544 | 6/1970 | Sesholtz.................................210/169 |
| 3,390,665 | 7/1968 | Wininger................................210/169 |
| 3,418,973 | 12/1968 | Saito.....................................210/169 |
| 3,472,381 | 10/1969 | Halpert..................................210/169 |
| 3,477,580 | 11/1969 | Willinger...............................210/169 |

Primary Examiner—Charles N. Hart
Attorney—Peter L. Berger

[57] ABSTRACT

An aquarium filter water recirculation system comprises a water-carrying and an inner air-carrying member attached to a base member which is supported above the floor of an aquarium. Air is passed through the inner cylindrical tube, diffused, and mixed with the water in the water-carrying member. The base member is made of polyvinyl chloride and is provided with a corrugated regular contour above which rests the gravel bed of the aquarium.

16 Claims, 3 Drawing Figures

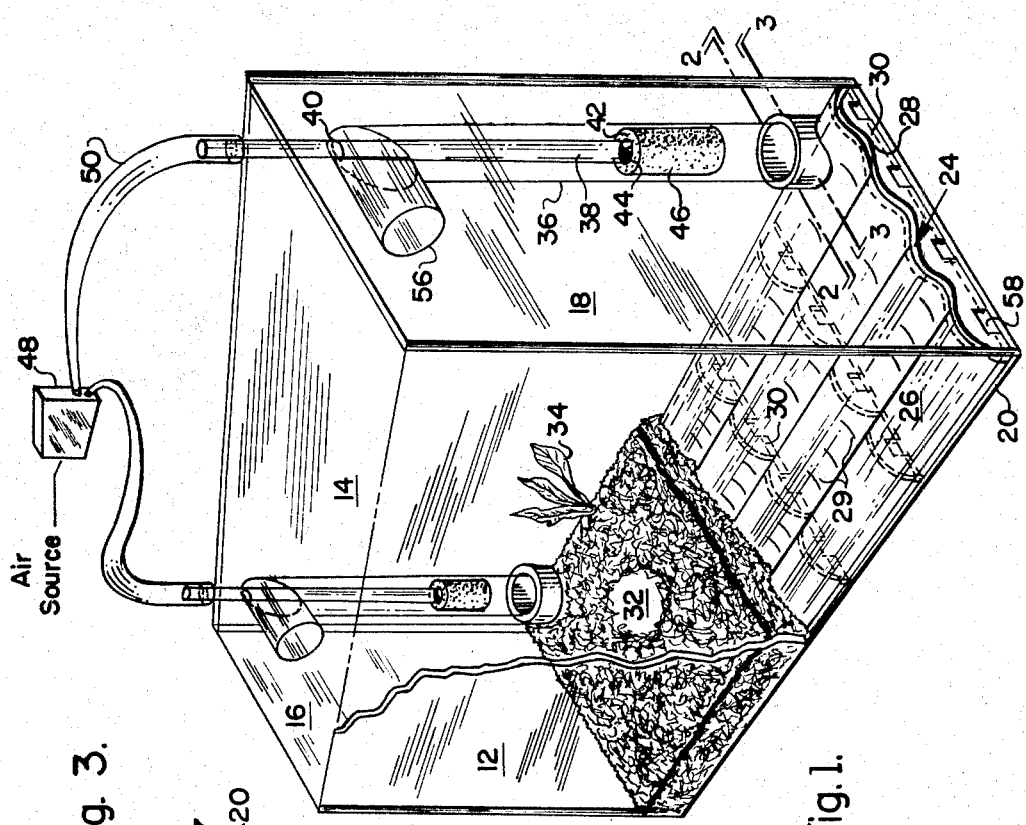
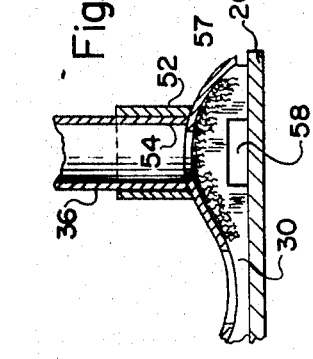
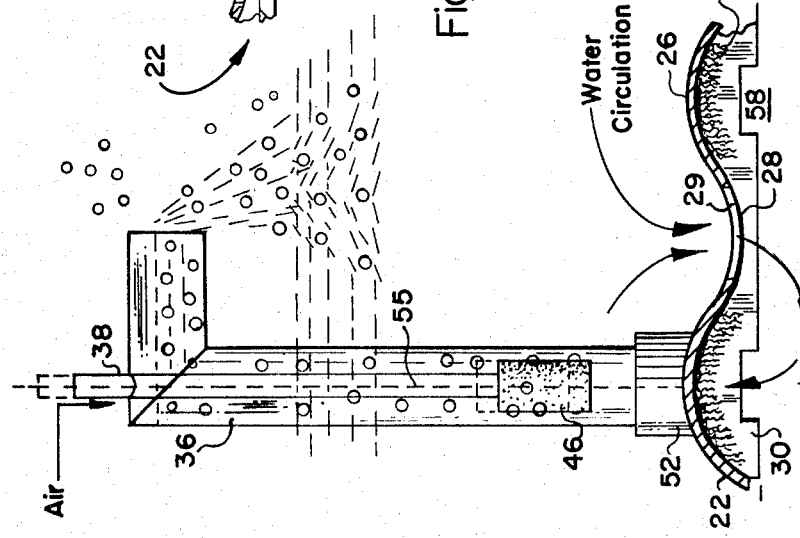
Fig. 1.
Fig. 2.
Fig. 3.
Inventor:
Harvey K. Cohen
By: Peter L. Berger
Attorney:

FILTER AND WATER RECIRCULATION SYSTEM

BACKGROUND OF THE INVENTION

This invention relates to an aquarium filter system, and more particularly, to an under gravel filter.

In aquariums, an important element for the health and well-being of the fish is an efficient filter system, such as a biological filter, to remove impurities from the aquarium water. An integral element in such filters is a water circulation system which carries the water through the biological filter in which the impurities in the system are removed and in which other chemical processes necessary to the maintenance of life within the aquarium are accomplished.

Among the foremost of such water circulation systems is the undergravel filter system utilizing a plurality of tubes connected to a base member supporting the gravel bed of the aquarium. These tubes generally are separated by a slight distance with a channel connection therebetween. Air is pumped into one of the tubes and carried to the other which is a water-carrying tube. The air mixes with the water thus providing a combined weight that is less than the other water in the water-carrying tube. The buoyance effect or "airlift" effect is such to cause the water in the water-carrying tube to be lifted.

When the water-carrying tube is submerged in water in a vertical position, the water levels inside the pipe and in the aquarium equilibrate. As the lighter air-water mixture moves to the top of the water-carrying tube, heavier water within the aquarium moves to replace the mixture. As long as air is injected, equilibrium never occurs and the air-water mixture is returned to the aquarium. By mixing the air and water, aeration is accomplished, which is important in the well-being of the aquarium system.

Such prior art water circulation systems suffer from several disadvantages. The flow rate efficiency obtained, in view of the motor used to supply the air, is generally low. Additionally, it is difficult, if not impossible, to vary the flow rate other than by varying the motor. Further, the air injected into the water-carrying tube is not diffused thereby decreasing the efficiency of the aeration process. In addition, these prior art systems are often expensive, difficult to use and not readily adaptable to the salt water hobbyist because of the materials used.

The prior art is also replete with filter plates which support the gravel bed within the aquarium. The plates are connected to the air and water-carrying tubes and are provided with slots or apertures permitting the water to pass therethrough. These filter plates suffer from several disadvantages. Foremost among the disadvantages relates to the materials from which they are constructed. Fiberglass is very popular for such use but has been found to be very dangerous for many types of fish. The fiberglass plates often give off small chips or fragments which become lodged in the gills of the fish impairing their ability to breathe. In addition, the shape of prior art filter plates fails to provide dormant areas in which algae-like living matter, important to the biological filtration process, can flourish.

In the prior art, there also exists undergravel filter and water recirculation systems advantageously employing a lift tube in which an air-carrying tube is inserted at an angle through the side of a water-carrying tubular member. As exemplary of such systems, reference may be had to U.S. Pat. No. 2,769,779 issued on Nov. 6, 1956 to Vansteenkiste et al. These type lift tube assemblies have similar disadvantages. For instance, when an air stone is used as a diffuser at the end of the air tube, the angular penetration of the air tube places a maximal frontal surface of the air stone directly in the path of the water flowing through the water-carrying tube such that the water recirculation flow rate may be adversely affected. Further, the prior art lift tube assemblies, such as that illustrated above, are cumbersome to handle and often require the hobbyist to place his hand within the aquarium to remove the assembly. Since the air in the air tube is directed at an angle with respect to the axis of the water-carrying member, a torque or cock like effect results which tends to move the assembly upwardly and at an angle with respect to the base of the aquarium. Still further, the angular entry of the air-carrying tube through the side of the water-carrying tube prevents the air-carrying tube from slideably communicating with the water-carrying tube, thus requiring a motor adjustment for varying the flow rate of the water recirculation system.

The Vansteenkiste patent also illustrates one form of the prior art base plates in which a porous type material allowing water to flow entirely therethrough fostering the growth of bacteria. Of the more significant disadvantages of this base are the failure to provide a dormant area to promote the growth of algae and the provision of a corrugated base having sharp edges and ridges tending to produce fragments which may injure the fish within the aquarium.

SUMMARY OF THE INVENTION

An object of my invention is to provide an improved water recirculation and filtering system obviating the above disadvantages.

Another object of my invention is to provide an airlift apparatus for the water circulation system which remedies the above disadvantages.

Still another object of our invention is to provide an airlift system in which the flow rate of the water recirculation system can be adjusted without adjusting the motor supplying pressurized air.

Yet another object of my invention is to provide a filter plate which does not permit particles thereof to break away and injure the fish in the aquarium.

Another object of my invention is to provide a filter plate which fosters the growth of algae and the like.

Still another object of my invention is to provide an integral filter and water circulation system which is convenient to use and easy to install.

Other objects, advantages, and features of this invention will become more apparent from the following description.

In accordance with the principles of my invention, the above objects are accomplished by providing for an aquarium system, an undergravel aquarium filter which comprises a base member resting beneath the gravel and maintained above the bottom of the aquarium tank, a water-carrying tubular member which is connected to the base member, and an air-carrying tubular member which is located within the water-carrying member and terminates therein. As a feature of my invention, the surface of rotation of the inner air-carrying tube about the central axis of the water-carrying tube is always confined within the inner surface of the outer water-carrying tube. The inner tube is inserted through the top of the outer tube and substantially parallel and coaxial therewith. Air is carried through the air-carrying member to mix with the water thereby producing a combined weight which is less than the water in the water-carrying tube, and its buoyancy lifts it to the top thereof.

An air stone is provided with a recess into which the air-carrying member is fit, and the air stone acts as a diffuser thereby enhancing the aeration of the water circulated within the aquarium system. With the passing of time, swelling of the air stone causes the fit between the air-carrying tube and the air stone to be extremely firm preventing the air stone from being pushed off the end of the air-carrying tube. As a feature of this invention, the coaxial relationship of the two tubular members enables the air stone to provide a minimal frontal surface blocking the flow of water.

The water-carrying tube is provided with an aperture in an elbow bend segment thereof through which the smaller cylindrical air-carrying tube is passed and which forms a slideable friction fit therewith. In this manner, the depth at which the diffused air enters the water-carrying tube is easily adjustable so that the flow rate within the recirculation system is varied.

As yet another feature of this invention, the base member is provided with a plate and support means for supporting the gravel bed above the plate and maintaining the plate above the floor of the aquarium. Preferably, the base member is of a non-porous material and is corrugated and provided with apertures through which the water is drawn along the bottom of the aquarium and into the water-carrying tube. As yet another feature of this invention, the base member is formed of polyvinyl chloride, which has the characteristic of being impervious to impurities within a fresh or salt-water aquarium and yet promotes the growth of algae. The corrugated plate is provided with dormant areas in which the growth of the algae is fostered and the corrugated shape is free of sharp edges or ridges.

BRIEF DESCRIPTION OF THE DRAWINGS

FIG. 1 is a perspective view of an aquarium with the water recirculation and filter system of this invention;

FIG. 2 is a sectional view taken along line 2—2 of FIG. 1 illustrating water-carrying and inner air-carrying members connected to a base member forming a part of the present invention; and FIG. 3 is a sectional view taken along line 3—3 of FIG. 1 illustrating the connection between the water-carrying and base members of our invention.

DETAILED DESCRIPTION

Referring to the FIGS., and particularly FIG. 1, there is shown an aquarium 10 having front and back sides 12 and 14, side walls 16 and 18, and a floor or bottom 20. The aquarium is constructed in the conventional manner and is adapted for use with a salt water or fresh water system.

In accordance with a feature of this invention, an undergravel filter and water recirculation system is provided and comprises a base member 22 including a corrugated plate 24 having alternating crown and valley regions 26 and 28, respectively, and spaced-apart apertures 29 located in the valley regions 28. The corrugated plate has the form of a smooth waveshape such as a sinusoid and is formed of a non-porous material. In addition, a plurality of spaced-apart support members 30 integrally formed with the plate 24 depend therefrom and rest upon the floor or bottom 20 of the aquarium providing a space between the valley region 28 and the floor 20.

The base member 22 is adapted to support a gravel bed 32 which is conventionally found in most aquariums. The gravel bed acts as a filter in the biological filtration process occurring within the aquarium system. Suitable decorative animate or inanimate objects, such as plant 34, are frequently placed within the gravel for aesthetic purposes.

In accordance with a feature of this invention, a lift tube assembly is provided which comprises an elbow shaped water-carrying member 36, preferably cylindrical, and an air-carrying member 38, also cylindrical in shape. An aperture 40 is provided at the top of the water-carrying cylindrical tubular member 36 through which the air-carrying member 38 is slideably and fixably inserted. The distal end 42 of air-carrying member 38 is friction fit within a recess 44 of a diffuser means or air stone 46, preferably made of a porous wood. An air pump 48 is connected by means of a hose 50 to the top of the air-carrying member 38. As illustrated in FIG. 1, two such airlift mechanisms are provided at either end of the aquarium 10.

Referring more particularly to FIG. 3, the base member 22 is provided with a connector means 52 into which is inserted the distal end 54 of water-carrying member 36 and is held therein by means of a friction fit.

With reference to FIGS. 1 and 2, the operation of this invention will be more fully described. When the water-carrying tube 36 is placed in the connector 52, the water level within the tube will be equal to that within the aquarium 10. Upon activation of the air pump 48, air is forced along conduit 50, through air-carrying tube 38 and through diffuser 46 to mix with the water in the water-carrying tube. The air-carrying tube 38 is substantially coaxial with the water-carrying tube 36 and the surface of rotation of the distal end 42 about the central axis 55 of the water-carrying tube is always confined within the inner surface of the outer tube. As a result thereof, the air stone presents a minimal frontal surface to the flow of water within the water-carrying tube 36, and further, the force of the air is substantially parallel to the water-carrying tube thus eliminating the undesirable torque or cocking like effect found in the oblique entry of the prior art tube. Further, the air-carrying tube 38 is straight without a bend therein which would hinder the flow of air therethrough.

The mixture of air and water is lighter than the remaining water within the tube, and the buoyancy of the mixture forces the aerated mixture to the top of tube 36 and back into the aquarium through the elbow bend segment 56 of the water-carrying tube. In this manner, the continued supply of air from pump 48 will maintain a state of disequilibrium throughout the water recirculation system and causes water to flow through the aquarium 10, base member 22 and water-carrying tube 36. It has been found that the flow rate achievable with my invention is significantly greater than that obtainable with prior art devices.

In accordance with another feature of this invention, the slideable and fixable friction fit between hole or aperture 40 and the air-carrying member 38 permits the depth to which the air-carrying member is inserted within the water-carrying member to be easily manually adjusted, as best seen by the dotted lines in FIG. 2, which results in a variation in the flow rate obtained. The air-carrying member 36 is capable of being set at any position between the top and bottom of the water-carrying tube.

It should be noted that the top of the water-carrying member may be above the top surface of the water within the aquarium, and thus, the hobbyist may conveniently retrieve the lift tube assembly without inserting his hand in the water. The tube within a tube configuration provides a more compact assembly which is also more easily manipulated.

In accordance with yet another feature of this invention, the air and water-carrying members are made of a rigid plastic, such as cellulose-acetate-butyrate (butyrate) and the distal end 42 of the air-carrying member 38 forms a friction fit within the recesses 44 of the diffuser or air stone 46. Since the air stone is made of wood, its swelling causes a tightening of the fit between the air-carrying tube and stone.

In accordance with yet another feature of this invention, the base member is made of a non-porous plastic material, such as polyvinyl chloride (PVC). Since the apertures 29 are located in the valley regions 28, a dormant area is formed in the crown regions 26. PVC fosters the growth of algae 57 which contributes to the biological filtration process and, because of its growth in the dormant region, its effect on the filtration process is continually enhanced. The flow direction of the water along the floor of the aquarium is guided by apertures 58 in the support members 30 which allow the water to flow to the bottom of the water-carrying members. To promote the uniformity of algae growth 57, the depth between the contiguous crown and valley regions is made constant as seen in FIGS. 1 and 2.

As still another feature of this invention, the air-water mixture from water-carrying tube 36 emerges above the surface of the water within the aquarium allowing the unwanted gases in the water to pass to the environment rather than being returned to the aquarium.

The airlift mechanisms and base member may, preferably, be formed of as a mold single assembly to simplify the manufacturing process therefor and decrease the cost of the filter and water recirculation system of this invention.

It will thus be seen that the objects set forth above, among those made apparent from the preceding description, are efficiently attained and, since certain changes may be made in the above apparatus without departing from the scope of this invention, it is intended that all matter contained in the above description and shown in the accompanying drawings shall be interpreted as illustrative and not in a limiting sense.

I claim:

1. For an aquarium system with water, an undergravel aquarium filter and water recirculation system comprising a base member adapted to rest below said gravel, a rigid outer water-carrying tube carrying water from the bottom of the aquarium and discharging the water on top of the water in the aquarium, a rigid inner air-carrying tube located within said outer water-carrying tube to discharge air into the path of flow of the water being carried by said water-carrying tube, said water-carrying tube having a substantially vertical portion and a substantially horizontal portion connected together to carry said water vertically upward and discharge said water respectively, said substantially horizontal portion including an aperture, said inner air-carrying member frictionally fitting within and cooperating with said aperture to fix the vertical position of said inner tube with respect to said outer tube, said inner tube being selectively and fixedly manually adjustable to selected heights with respect to said outer tube and being frictionally held in said selected heights by said aperture.

2. A device as set forth in claim 1, wherein said water-carrying tube is cylindrical and said air-carrying member is cylindrical.

3. A device as set forth in claim 1, wherein said top portion is above the water in said aquarium.

4. A device as set forth in claim 1, wherein said air-carrying and said water-carrying tubes are plastic.

5. A device as set forth in claim 4, wherein said plastic is butyrate.

6. A device as set forth in claim 1, comprising an air diffuser connected to said distal end of said air-carrying tube.

7. A device as set forth in claim 1, wherein said air-carrying tube is substantially coaxial with said water-carrying tube.

8. A device as set forth in claim 1, wherein said aquarium is provided with a gravel bed and a floor and said base member comprises a plate and support means for supporting said gravel bed above said plate and maintaining said plate above said floor.

9. A device as set forth in claim 8, wherein said support means are integrally formed with said plate.

10. A device as set forth in claim 8, wherein said plate is corrugated having alternating crown and valley regions, said valley regions being provided with apertures allowing water in said aquarium system to pass.

11. A device as set forth in claim 8, wherein said plate is non-porous.

12. A device as set forth in claim 11, wherein said plate is made of polyvinyl chloride.

13. A device as set forth in claim 10, wherein the path of flow of said water is below said base member and the height of said crowns are higher than the path of flow of said water to provide dormant zones fostering the growth of algae in said dormant zones.

14. In an aquarium having a gravel bed and a floor, a base member comprising a plate and support means for supporting said gravel bed above said plate and maintaining said plate above said floor, said plate being non-porous and corrugated in shape having alternating crown and valley regions, said valley regions being provided with apertures allowing water in said aquarium system to pass, the path of flow of the water in said aquarium being below said base member, the height of said crowns being higher than the path of travel of said water to form dormant zones fostering the growth of algae in said dormant zones.

15. A device as set forth in claim 14, wherein said support means is integral with said plate.

16. A device as set forth in claim 14, wherein said plate is made of polyvinyl chloride.

* * * * *